July 15, 1969    A. J. BACHELDER ETAL    3,455,692
COMPOSITE PHOTOGRAPHIC FILM ROLL Filed Jan. 8, 1965    3 Sheets-Sheet 1

INVENTORS
Albert J. Bachelder
George C. Hibben
William Rebelsky
BY Brown and Mikulka
and
Charles S. McGuire
ATTORNEYS July 15, 1969    A. J. BACHELDER ETAL    3,455,692
COMPOSITE PHOTOGRAPHIC FILM ROLL
Filed Jan. 8, 1965    3 Sheets-Sheet 2
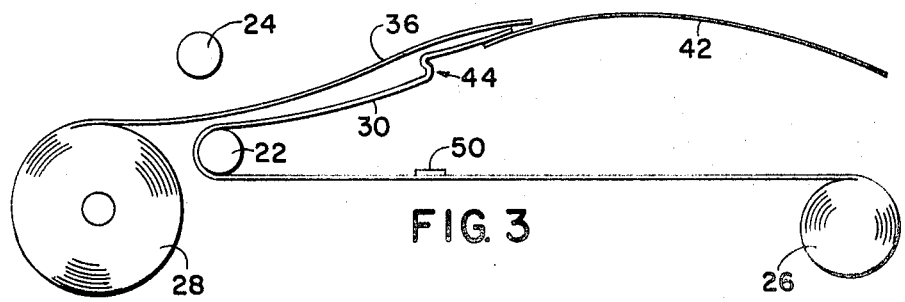
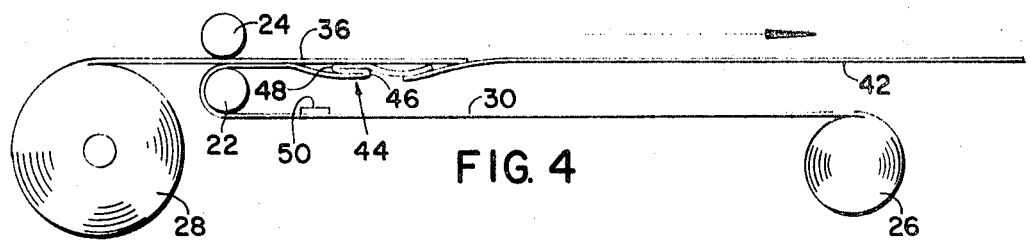
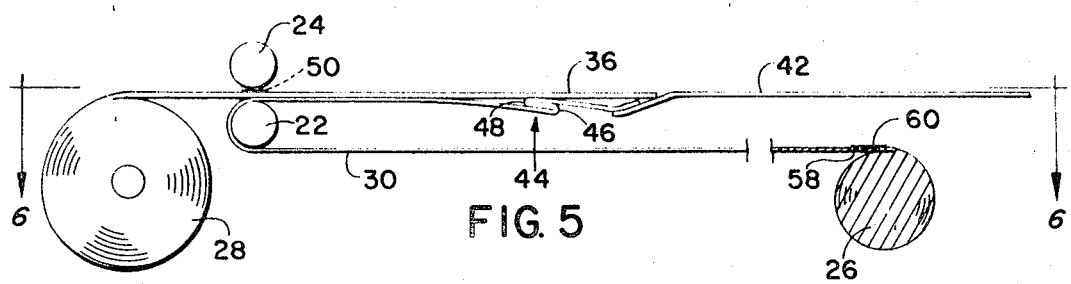
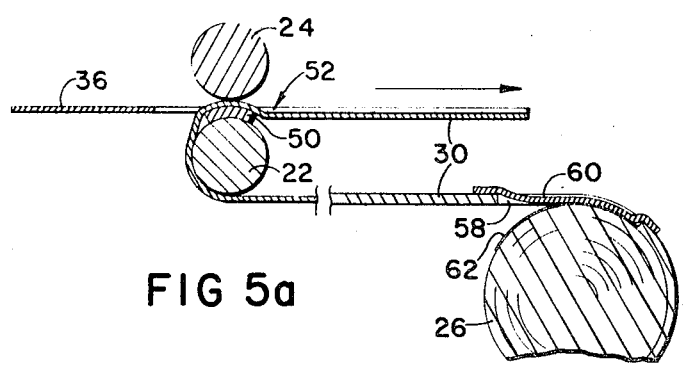
INVENTORS
Albert J. Bachelder
George C. Hibben
William Rebelsky
BY Brown and Mikulka
and
Charles S. McGuire
ATTORNEYS July 15, 1969     A. J. BACHELDER ET AL     3,455,692
COMPOSITE PHOTOGRAPHIC FILM ROLL
Filed Jan. 8, 1965     3 Sheets-Sheet 3

INVENTORS
Albert J. Bachelder
George C. Hibben
BY William Rebelsky
Brown and Mikulka
and
Charles J. McGuire
ATTORNEYS

United States Patent Office 3,455,692
Patented July 15, 1969

3,455,692
COMPOSITE PHOTOGRAPHIC FILM ROLL
Albert J. Bachelder, Lexington, George C. Hibben, Lincoln, and William Rebelsky, Newton, Mass., assignors to Polaroid Corporation, Cambridge, Mass., a corporation of Delaware
Filed Jan. 8, 1965, Ser. No. 424,307
Int. Cl. G03c 3/02
U.S. Cl. 96—78    13 Claims

ABSTRACT OF THE DISCLOSURE

A photographic film assemblage having two photographic sheets adapted to be advanced in a superposed condition through photographic apparatus in predetermined longitudinal registration wherein said assemblage includes structure for increasing the friction between the superposed sheets to maintain the longitudinal registration between the sheets.

---

This invention relates to an improved composite photographic film roll of the type comprising a pair of elongated strips of photographic materials initially supplied as two rolls adapted to be unwound and advanced into superposition with one another through photographic apparatus.

Photographic film rolls of the type shown in Wolff Patent No. 2,630,385 comprise a composite assembly of two rolls of photographic sheet material together with a suitable developing material adapted for use in photographic cameras of the type shown, for example, in Carbone et al. Patent No. 2,455,111. One of the rolls includes photosensitive portions which are unwound from the supply roll and advanced to an exposure position within the camera. After the camera shutter is operated to form a latent image in the photosensitive portion it is further advanced into superposition with a second sheet material, normally supplied from a second roll of such material. As the material are advanced the developing fluid is dispensed and spread between them by means of a pair of pressure-applying members through which the two materials are advanced.

When the two strips are superposed with the developer spread therebetween a positive image is formed in an area of the second strip which opposes the exposed photosensitive portion of the first strip according to the well-known diffusion transfer process. The strips are formed with intermittent photosensitive and image-receiving portions, respectively. That is, one strip comprises a plurality of photosensitive portions, each separated by a flexible strip of nonphotosensitive sheet, and the other strip likewise is made up of a plurality of separate image-receiving portions spaced longitudinally on the strip. Thus, it is essential for the proper formation of a diffusion transfer image in the portion intended therefor that the two strips bear a predetermined longitudinal relationship as they are advanced into superposition. Otherwise the photosensitive portion in which the latent image is formed and developed will not be fully superposed with one of the image receiving areas of the other strip and a positive image will be formed in only a portion of the full area intended for this purpose.

A photographic film roll of the above-described type having means for insuring proper initial longitudinal registration of the two strips is disclosed in U.S. patent application Ser. No. 323,686, of Albert J. Bachelder, filed Nov. 14, 1963, now U.S. Patent 3,270,653, and assigned to applicants' assignee. The misregistration which this invention is designed to correct results when the two rolls are initially placed within the camera, and the pressure-applying members brought together to hold the strips emanating from the rolls in frictional engagement, with slack existing in one of the strips between the said members and the portion of the film roll which is grasped to advance the strips through the camera. The film roll is so designed that the strips are in proper longitudinal registration when no slack exists, and the misregistration resulting from an initial slack in one of the strips is likely to continue as the strips are advanced since they are maintained in a rather high degree of frictional engagement by the pressure-applying members. The slack is removed from the initially misplaced strip according to the invention set forth in the above-mentioned U.S. application by providing means for releasing the frictional engagement of the two strips during a portion of the advancement thereof, allowing one strip to be advanced through the pressure-applying members independently as the slack is removed from the other strip.

Once any initial slack has been removed the strips are in proper longitudinal registration for advancement through the camera to form photographic images as described above. However, it is possible that improper advancement of the strips after removal of the slack but prior to development of the first image may result in the strips again becoming misregistered. This will obviously occur if one of the strips is moved longitudinally with respect to the other after the two have initially been placed in proper longitudinal registration.

Accordingly, it is an object of the present invention to provide a composite photographic film roll comprising two strips of photographic sheet materials adapted to be advanced through photographic apparatus in predetermined longitudinal relationship and including means for maintaining said strips in said relationship.

A further object is to provide means for preventing or retarding relative longitudinal movement of a pair of flexible, superposed strips of photographic materials during longitudinal advancement thereof through photographic apparatus.

Another object is to provide, in a self-developing, composite film roll wherein two strips are advanced in superposed relation, means associated with at least one of the strips for bringing said strips into a predetermined longitudinal relationship and for maintaining such relationship during advancement of said strips.

Still another object is to provide a new and improved composite photographic film roll including means for insuring that two elongated strips are positioned and maintained in a predetermined longitudinal relationship as they are drawn through photographic apparatus.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGS. 3–5 are side elevational views of the film roll of the invention shown in various stages of advancement between a pair of pressure-applying members, with a fragment of FIG. 5 in vertical section;

FIG. 5a is an enlarged, fragmentary view of a portion of the assembly, in section on the line 5a—5a of FIG. 7;

FIG. 8a is an enlarged, fragmentary view in section on the line 8a—8a of FIG. 8, showing a portion of the film roll at a position of advancement subsequent to that of FIG. 5a.

Figure 1:
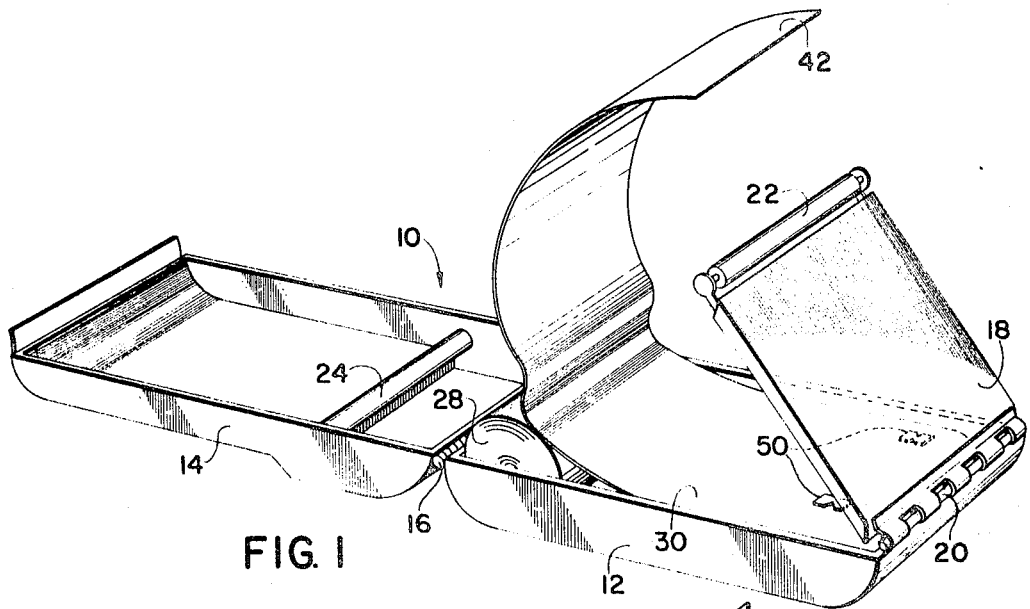
FIGURE 1 is a perspective view of the composite photographic film roll of the present invention being loaded into photographic apparatus of the type wherein it is employed.

Referring now to the drawings, shown in FIGURE 1 is a somewhat diagrammatic illustration of photographic apparatus, denoted generally by reference numeral 10, wherein the film roll of the present invention is adapted to be utilized. Photographic apparatus 10 includes first and second portions 12 and 14 hingedly connected at 16 for movement between open and closed positions relative to one another. Bridge portion 18 is connected to first portion 12 by means of hinge 20 at the opposite end of first portion 12 from its hinged connection with second portion 14. Bridge portion 18 carries, at the end thereof opposite hinge 20, a pressure-applying member in the form of roller 22. Second portion 14 carries roller 24, which is positioned adjacent roller 22 when apparatus 10 is in the closed position. Photographic apparatus 10 is shown herein for illustrative purposes only, and it is to be understood that the structural details thereof may take a variety of forms. Typical of the photographic apparatus of this type, known in the art as self-developing cameras and typified by the well-known Polaroid Land Camera, are those found, for example, in the aforementioned Carbone et al. Patent No. 2,455,111.

The photographic product of the present invention includes two elongated strips of flexible sheet material, which may be conveniently supplied in an initially rolled-up condition. First roll 26 includes photosensitive portions which may be exposed to form a latent image therein by means of photographic apparatus 10. Second roll 28 also comprises a photographic sheet material having areas adapted to be superposed with the photosensitive areas of first roll 26 to assist in photographic processing thereof. The said areas of second roll 28 are preferably adapted to receive a photographic image from the photosensitive areas of first roll 26 by means of the well-known diffusion transfer process. Second roll 28 carries a plurality of rupturable containers which releasably confine a suitable developing material which, when spread between the superposed portions of the two rolls, coacts therewith in the manner described in the aforesaid Wolff and Carbone patents to produce photographic prints.

First roll 26 includes a predetermined length of leading strip, or sheet material 30 which precedes the first photosensitive portion 32 of a plurality of such portions contained by roll 26. Intermediate portion 34 of a non-photosensitive, flexible sheet material may be interposed between portion 32 and the next succeeding photosensitive portions 35. Leading trip 30, photosensitive portions 32 and 35 and intermediate portion 34 may be attached by any convenient adhesive means. Second roll 28 also includes a predetermined length of leading strip, or sheet material 36 which precedes the first processing area 38 of a plurality of such areas carried by second roll 28. Associated with each of the processing areas is a rupturable container 40 which carries the processing agent to be spread between area 38 and area 32 as the two areas are brought into superposition in photographic apparatus 10. Both leading strips 30 and 36 are affixed to a single leader 42. When the product is loaded in the apparatus in the manner illustrated in FIGURE 1, first and second rolls 26 and 28 are placed in opposite ends of first section 12, with bridge portion 18 moved about hinge 20 to a position wherein it uncovers the fiirst section. After insertion of the film roll, bridge portion 18 is moved to a covering position with respect to strip 30. Leader 42 is then laid on top of bridge portion 18 and second portion 14 is moved about hinge 16 to the closed position, whereby the product is contained within apparatus 10 with the exception of a portion of leader 42 which extends through an opening in one end of the apparatus adjacent hinge 20.

When rolls 26 and 28 are unwound and extend in superposition to one another from their respective connections with leader 42, the predetermined lengths of strips 30 and 36 are such that photosensitive area 32 will be in registration with processing area 38 relative to the longitudinal axes of the elongated strips which make up rolls 26 and 28. The subsequent photosensitive areas and processing areas will likewise be in longitudinal registration as rolls 26 and 28 continue to be unwound and superposed. Thus, if there is any slack in either of leading strip 30 or 36 between the connection thereof with leader 42 and the first photosensitive or processing area, these areas will not be in longitudinal registration, nor will the subsequent areas. It is evident from FIGURE 1 that strip 30 must be unwound from roll 26 by a greater amount than strip 36 must be unwound from roll 28 in order to load the film roll into apparatus 10 in the manner described. There is, therefore, a greater likelihood that slack may occur in strip 30 than in strip 36. It is also more likely that slack in strip 30 would go unnoticed by an operator loading apparatus 10 since strip 30 is covered by strip 36 and cannot be seen by an operator viewing the assembly from the top after bridge portion 18 has been positioned and before the apparatus has been closed.

This condition is illustrated more fully in FIGS. 3–5. In FIG. 3 the positions of the various elements are illustrated just prior to movement of second portion 14 into the closed position with respect to first portion 12. Bridge portion 18 is already in place with strip 30 extending around roller 22. Slack portion 44 may be seen in strip 30 between the connection thereof with leader 42 and roller 22. When apparatus 10 is completely closed, as in FIG. 4, roller 24 is positioned adjacent roller 22 and strips 30 and 36 are frictionally engaged between the rollers. Slack portion 44 may be seen to include leading edge 46 and trailing edge 48, whereas strip 36 extends directly from its connection with leader 42 to its frictional engagement with strip 30 between rollers 22 and 24. As leader 42 is manually advanced in the direction indicated by the arrow in FIG. 4, strip 36 is advanced therewith since it is connected directly to leader 42. Strip 30 is also advanced in a like manner since it is frictionally engaged with strip 36 between rollers 22 and 24. That is, strip 30 is not advanced because of its connection with leader 42 but rather because strip 36 is being advanced and is frictionally engaged with strip 30. The two strips emanating from rolls 26 and 28 are thus drawn into superposition after passing through rollers 22 and 24, but are not in the desired longitudinal registration due to slack portion 44 in strip 30.

Previously mentioned in U.S. patent application Ser. No. 323,686, now U.S. Patent No. 3,270,653, includes means for insuring that slack portion 44 will be removed from strip 30 before photosensitive area 32 is advanced into superposition with processing area 38. Such means include spacer elements 50 which are attached to strip 30, and elongated slots 52 which are formed in strip 36. As seen in FIG. 5a, spacer elements 50 are advanced between rollers 22 and 24 as strip 30 continues to be advanced due to its frictional engagement between the rollers with strip 36. Due to the additional thickness of spacer elements 50, rollers 22 and 24 are forced apart by a greater amount when spacer elements 50 are drawn therebetween. As best seen in the plan views of FIGS. 6 and 7, spacer elements 50 are laterally positioned on strip 30 in registration with the lateral position of slots 52 in strip 36.

It will also be noted that slots 52 are somewhat wider than spaced elements 50. Thus, the spacer elements, or the portion of strip 30 to which the elements are attached, may protrude through slots 52 when spacer elements 50 are brought between rollers 22 and 24. Also, the thickness of spacer elements 50 is greater than the thickness of strip 36. Consequently, strips 30 and 36 are no longer frictionally engaged with one another due to the compressive force of rollers 22 and 24 since the rollers are now spread apart by a distance greater than the combined thickness of strips 30 and 36. Only strip 30 and spacer elements 50 are engaged between rollers 22 and 24 since the additional thickness produced by the spacer elements projects through slots 52. This may be seen more clearly in the side sectional view of FIG. 5a.

When the roll has been advanced to the point where spacer elements 540 are engaged between rollers 22 and 24, further advancement of leader 42 will advance only strip 36, and consequently roll 28. Strip 36 is advanced as before due to its direct connection with leader 42. The frictional engagement between strips 30 and 36 has been reduced sufficiently by spreading the rollers in the manner indicated so that strip 30 is no longer advanced through the rollers by advancement of strip 36. The portion of strip 30 which is attached directly to leader 42 is advanced therewith, but the portion of strip 30 rearward (on the left-hand side as seen, for example, in FIG. 5) of slack portion 44 is not advanced. That is, advancement of leader 42 now advances both strips 30 and 36, but only that portion of strip 30 forward (on the right-hand side as seen in FIG. 5) of slack portion 44.

Figure 6:
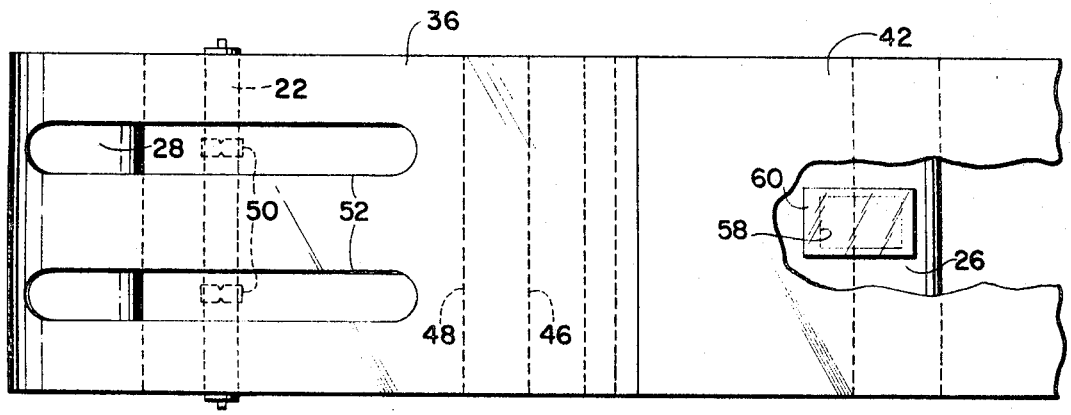
FIGS. 6–8 are plan views of the novel film roll, as seen from a position indicated by the line 6—6 in FIG. 5, illustrating the manner of advancement thereof in accordance with the present invention.
Figure 7:
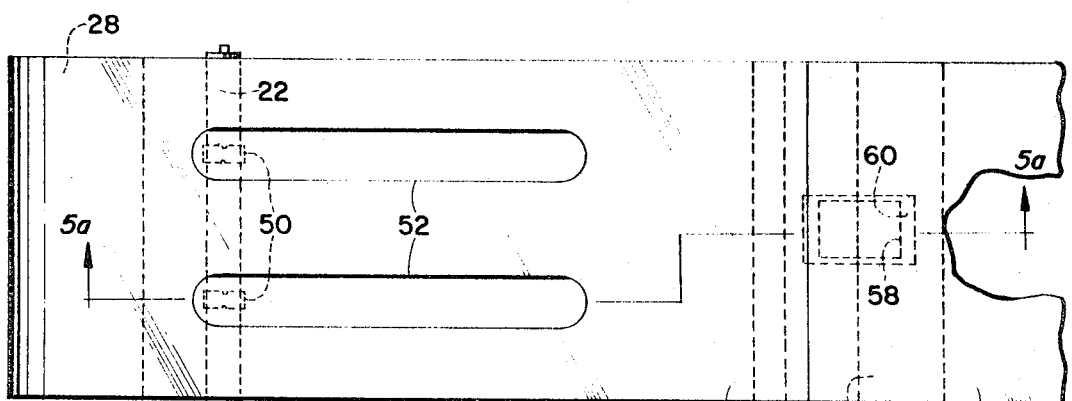
Figure 8:
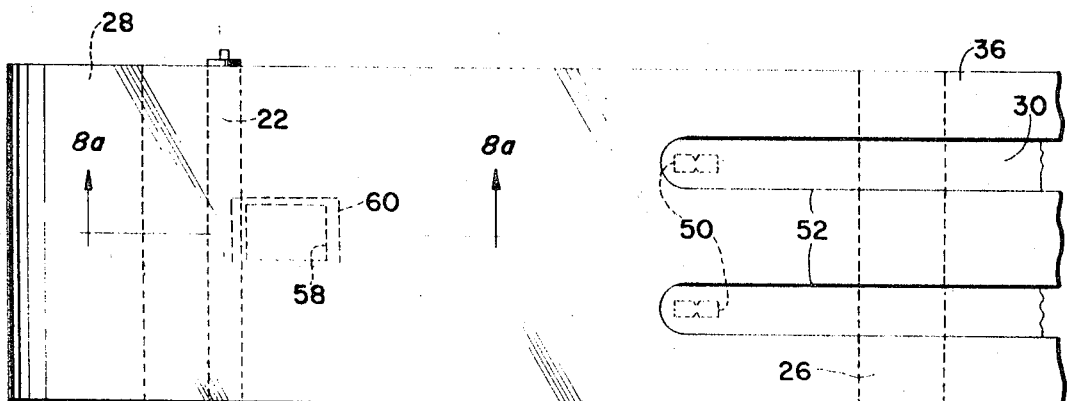
Figure 8A:
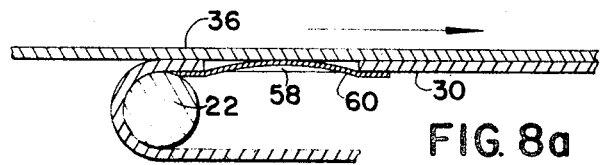

This may be clearly seen from the plan views of FIGS. 6–8. In FIG. 6 spacer elements 50 have just been engaged between rollers 22 and 24, and leading and trailing edges 46 and 48, respectively, of slack portion 44 may been seen in dotted lines. As leader 42 is advanced from the position shown in FIG. 6, both strips 30 and 36 are advanced from their respective connections with the leader. Slack portion 44 begins to be removed from strip 30, and as leader 42 continues to be advanced the slack portion is entirely removed. This condition is shown in FIG. 7, wherein it may be seen that both strips 30 and 36 now extend directly from their respective connections with leader 42 without slack in either strip. Further advancement of leader 42 from the position shown in FIG. 7 will result in advancement of both strips 30 and 36 due to their direct connections with leader 42 and not due to the frictional engagement of one strip with the other between rollers 22 and 24. Since both strips 30 and 36 now extend directly from their respective connections with leader 42, with no slack in either material, the strips from rolls 26 and 28 will be in the desired longitudinal registration as they are advanced into superposition between the rollers.

The structure and function of the various portions of the film roll described thus far comprise the principal subject matter of U.S. patent application Ser. No. 323,686, now U.S. Patent No. 3,270,653 mentioned hereinbefore. Through the operation thereof, the two strips including the photographic sheet materials are brought into proper longitudinal registration, even though initially placed in improper registration, by manual advancement of leader 42. The strips are in proper registration as pictured in FIG. 7 and will remain so unless one strip is moved with respect to the other. This is unlikely to happen as long as the operator continues to advance the roll by pulling on leader 42 since both strips are attached to the leader and can move only in unison when the leader is advanced. However, the strips have been advanced to the position shown in FIG. 8 the trailing end of the leader has been advanced out of the camera and leading portions of strips 30 and 36 extend therefrom. It is therefore possible for the operator to release his grasp on leader 42 and to continue the advancement of the composite film roll by grasping and pulling one or both of strips 30 and 36. Since the two strips are urged into frictional engagement by rollers 22 and 24, as previously explained, manual advancement of one of the strips is likely to result in advancement of the other, and thus no relative longitudinal movement between the two. It will also be readily understood, however, that if only one of the two strips is grasped and advanced with a sudden, sharp pull that the frictional engagement of the strips between the rollers may be overcome. This, of course, will result in the strip which is grasped slipping on the other strip and moving longitudinally with respect thereto. The strips will then be in misregistration again wth the resulting problems explained earlier herein.

Figure 2:
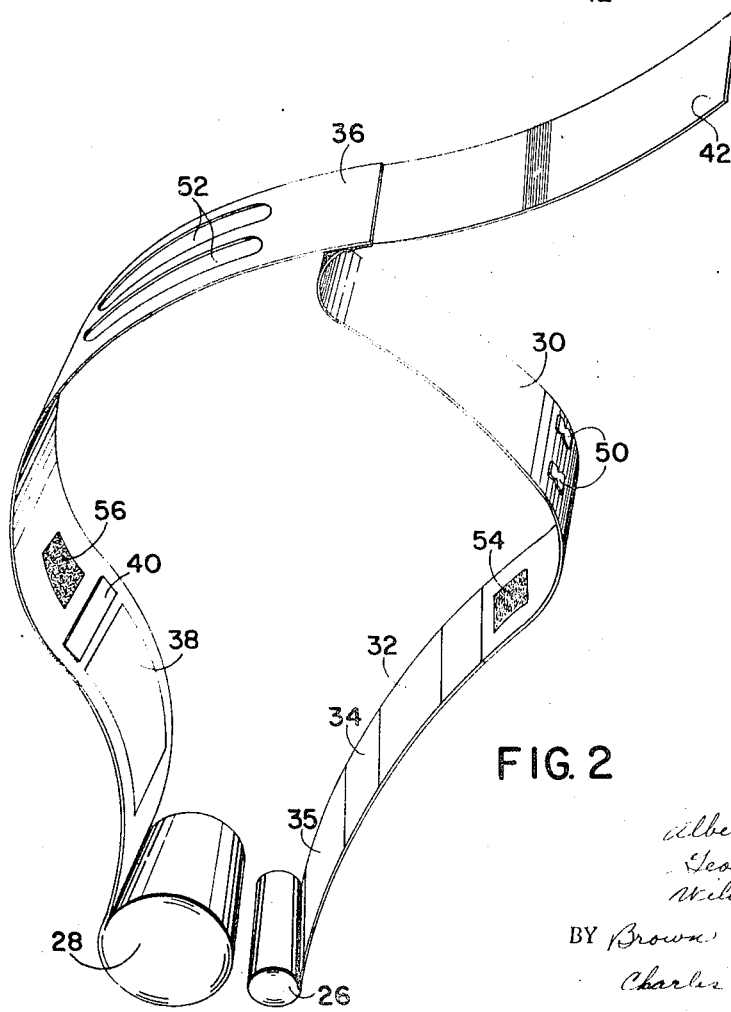
FIG. 2 is a perspective view of one embodiment of the film roll of the invention showing the two elongated strips in partially rolled condition.

The present invention provides means associated with one or both of strips 30 and 36 for retarding or preventing the strips from moving relative to one another during advancement as described in the preceding paragraph. As seen in FIG. 2, strip 30 has associated therewith surface portion 54 facing strip 36 as the two are brought into superposition. Likewise, in the present embodiment, strip 36 includes surface portion 56 which faces strip 30 and is so positioned as to contact surface portion 54 in face-to-face relation when strips 30 and 36 are brought into superposition with one another between rollers 22 and 24. Surface portions 54 and 56 comprise materials which tend to reduce or eliminate the possibility of strips 30 and 36 moving relative to one another when the subject surface portions are superposed between the rollers. The materials which make up surface portions 54 and 56 may be coated or deposited, for example, directly on strips 30 and 36, or may be carried by a separate base material which in turn is secured to the appropriate portion of the strips as by pressure or heat-sensitive adhesives. The materials may be of any type which, when brought into face-to-face contact, significantly increase the friction between strips 30 and 36. As an illustrative example, a colloidal dispersion of silica coated on a suitable base material, according to well-known practice, would serve effectively to increase the frictional engagement of the sheets in the manner described. When added to the frictional engagement already provided by the rollers, the high friction surfaces of portions 54 and 56 retard any tendency of the strips to move longitudinally relative to one another sufficiently to prevent further misregistration. The areas of surface portions 54 and 56 are chosen in accordance with the degree of desired frictional engagement of the strips and may, for example, extend completely across the full width of the strips. As an alternate embodiment, surface portions 54 and 56 may comprise materials of the self-adhering type, such as the well-known pressure-sensitive, latex base adhesives used in so-called "self sealing" envelopes, for example. Again such materials could either be coated directly on strips 30 and 36 or applied to a base support which is then cut to proper size and attached to the strips. Surface portions 54 and 56 would not appreciably adhere to the next inner convolution of rolls 26 and 28 since the materials are not of the type which adhere to the normal surfaces of strips 30 and 36; thus, there would be no more effort involved in unrolling the strips as they are advanced. However, as surface portions 54 and 56 are urged into face-to-face contact between rollers 22 and 24 a seal would be formed which would effectively prevent relative longitudinal movement of strips 30 and 36.

A still further embodiment of the invention is shown in FIGS. 5–8a. In this embodiment strip 30 includes a window, or cut-out area 58 which is covered by a piece of pressure-sensitive adhesive tape 60. The adhesive surface of tape 60 extends through window 58 and contacts the next inner convolution of roll 26 to form a seal therewith until strip 30 is advanced sufficiently to break the seal.

As shown in FIGS. 5–7, roll 26 has been unwound to the point where the seal has been partially broken by separating the adhesive surface of tape 60 from the next inner convolution of the roll. Tape 60 is preferably so spaced on strip 30 from spacer elements 50 that the seal is in the process of being broken as the spacer elements come between rollers 22 and 24, as best seen in the enlarged view of FIG. 5a. Breaking of the seal, of course, tends to retard advancement of strip 30, which may be a definite advantage at the time spacer elements 50 come between the rollers since only that portion of strip 30 forward of any slack is supposed to be advanced at this time. That is, in addition to relieving the frictional engagement of the strips between the rollers, any tendency of strip 30 to be advanced until all the slack has been removed therefrom is retarded by the adherence of tape 60 to the next inner layer of roll 26.

After the seal between tape 60 and the underlying portion of roll 26 has been broken, continued advancement of strip 30 brings tape 60 around roller 22 with the adhesive surface of the tape facing strip 36. Although the thickness of the sheet materials have been exaggerated somewhat in FIG. 5a, it will be readily appreciated that tape 60 will again extend through window 58 and adhere to the opposing surface of strip 36. Thus, a second seal is formed by tape 60 (the first being that between the tape and the next inner layer of roll 26) and strips 30 and 36 are effectively joined to prevent relative longitudinal movement resulting in misregistration. Material 62 may be affixed to strip 30 as shown in FIG. 5a to cover that area of the strip opposing the adhesive surface of tape 60 if the material of strip 30 is likely to be peeled away as the seal is broken and destroy the tackiness of the adhesive surface of tape 60. Thus, material 62 may comprise any suitable substance, such as virtually any flexible plastic, presenting toward tape 60 a surface to which the tape adheres, but which does not separate and remain adhered to the tape when the seal is broken. A tacky surface on tape 60 for effecting the second seal with strip 36 is thereby assured.

Thus, it may be seen that the present invention provides a composite film roll for use in photographic apparatus of the general type and in the manner described. The film roll includes two strips of photographic material which are brought to a predetermined position of longitudinal registration and maintained in such position through operation of novel elements of the film roll during advancement thereof through the apparatus in the usual manner.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A composite photographic product for use in photographic apparatus having a pair of pressure-applying members, said product comprising, in combination:
   a first, flexible, elongated strip including a photosensitive area;
   a second, flexible, elongated strip including an image-receiving area;
   means for advancing said first and second strips in a longitudinal direction into superposition with one another between said pair of pressure-applying members, whereby said strips are urged into frictional engagement with one another by said members;
   means for decreasing the friction between said superposed strips as said strips pass between said pressure-applying members; and
   means for maintaining a predetermined longitudinal registration between said areas on said strips, said means being associated with at least one of said strips, and spaced from a leading edge of said area on said one strip by a predetermined distance, and arranged to contact the superposed portion of the other of said strips at a location spaced from a leading edge of said area on said other strip by a distance substantially equal to said predetermined distance, during advancement thereof, said last-named means being effective to substantially increase said frictional engagement while in contact with said other strip, thereby decreasing any tendency of said strips to move relative to one another.

2. The invention according to claim 1 wherein said last-named means comprises a high-friction coating applied to portions of both of said strips in areas thereon which are brought into superposition, whereby the coated portion of said first strip contacts the coated portion of said second strip.

3. The invention according to claim 2 wherein said high-friction coating comprises a colloidal dispersion of silica.

4. A composite photographic product for use in photographic apparatus having a pair of pressure-applying members, said product comprising, in combination:
   a first, flexible, elongated strip including a photosensitive area;
   a second, flexible, elongated strip including an image-receiving area;
   means for advancing said first and second strips in a longitudinal direction into superposition with one another between said pair of pressure-applying members, whereby said strips are urged into frictional engagement with one another by said members;
   means for decreasing the friction between said superposed strips as they pass between said pressure-applying members; and
   means for maintaining a predetermined longitudinal registration between said areas on said strips, said means being spaced from a leading edge of one of said areas on one of said strips by a predetermined distance and adapted to contact the superposed portion of the other of said strips at a location spaced from a leading edge of said area on said other strip by a distance substantially equal to said predetermined distance for effecting a seal between predetermined portions of said first and second strips as said portions are brought into superposition with one another, said seal being effective to prevent movement of said strips relative to one another.

5. The invention according to claim 4 wherein said last-named means comprises a piece of material secured to one of said strips, said material having a pressure-sensitive adhesive surface which is urged into contact with the superposed portion of the other of said strips as the two strips are advanced between said pressure-applying members, thereby sealing said strips together.

6. A composite photographic product for use in photographic apparatus having a pair of pressure-applying members, said product comprising, in combination:
   a first, flexible, elongated strip including a photosensitive area;
   a second, flexible, elongated strip including an image-receiving area;
   means for advancing said first and second strips in a longitudinal direction into superposition with one another between said pair of pressure-applying members, whereby a first surface of said first strip is in face-to-face contact with a first surface of said second strip;
   means for decreasing the friction between said superposed strips as said strips pass between said pressure-applying members; and
   portions of each of said first surfaces having associated therewith a self-sealing pressure-sensitive adhesive material, each of said portions being equidistantly spaced from a leading edge of said area on said strip so as to come into mutual contact during advancement of said strips, whereby said strips adhere to one another at said portions thereof to prevent movement of said strips relative to one another and for maintaining a predetermined longitudinal registration between said areas.

7. The invention according to claim 6 wherein said adhesive material comprises a latex base substance of the type which adheres to a similar substance upon contact therewith.

8. The invention according to claim 6 wherein said first and second strips are initially supplied in roll form adapted to be unwound and brought into superposed relation within said photographic apparatus by manually advancing end portions of said strips which extend outside said apparatus.

9. A composite photographic product including first and second rolls of flexible sheet materials adapted to be unwound and advanced into superposed relation between a pair of pressure-applying members, whereby said sheets are urged into frictional engagement with one another by said members, said product comprising, in combination:
  (a) means defining an elongated opening in said first roll having a long axis in the direction of travel of said materials between said pressure-applying members;
  (b) spacer means attached to said second roll in registration with said opening when said materials are in said superposed relation;
  (c) said spacer means having a length and width less than that of said opening and a thickness greater than that of the material of said first roll, whereby said spacer means separates said pressure-applying members upon passing therebetween and reduces said frictional engagement;
  (d) means associated with said second roll and presenting a pressure-sensitive adhesive surface contiguous with a portion of that surface of the material of said second roll which is initially in contact with the next inner layer of said second roll and is unwound and urged into engagement with the opposing surface of the material of said first roll;
  (e) said last-named means being effective to create a first seal between said portion and said next inner layer, said first seal being broken by unwinding said second roll during advancement of the material thereof; and
  (f) said last-named means being effective to create a second seal between said portion and said opposing surface of the material of said first roll upon urging the two into engagement.

10. The invention according to claim 9 wherein said portion of said second roll is so arranged with respect to said spacer means that the latter are advanced between said pressure-applying members to separate the same substantially at the same point in the advancement of said second roll that said first seal is broken.

11. The invention according to claim 9 wherein said last-named means comprises a piece of pressure-sensitive adhesive tape secured to said second roll with the adhesive surface disposed to contact said opposing surface of the material of said first roll upon being advanced into superposition therewith.

12. The invention according to claim 11 wherein said second roll includes an opening through which a portion of said tape engages the next inner layer of said second roll to effect said first seal.

13. The invention according to claim 12 wherein at least the surface portion of said next inner layer which is contacted by said tape to effect said first seal presents for engagement by said tape a surface to which said adhesive surface of said tape adheres and which leaves said adhesive surface in an adhesive condition upon breaking of said first seal, and thereby in a condition to effect said second seal upon contact with said opposing surface of the material of said first roll.

References Cited

UNITED STATES PATENTS

| | | | |
|---|---|---|---|
| 2,188,779 | 1/1940 | Roehrl | 96—78 |
| 2,698,243 | 12/1954 | Bachelder et al. | 96—76 X |
| 2,964,423 | 12/1960 | Van Stappen | 117—138.8 |
| 3,022,170 | 2/1962 | Flinchbaugh et al. | 96—78 |
| 3,270,653 | 9/1966 | Bachelder | 96—78 |

NORMAN G. TORCHIN, Primary Examiner

R. E. FICHTER, Assistant Examiner

U.S. Cl. X.R.

95—89